July 14, 1964    R. C. WAGNER    3,140,556
PERCUSSION TRAP FOR ANIMALS
Filed July 3, 1961

RICHARD C. WAGNER
INVENTOR
HUEBNER & WORREL
ATTORNEYS
BY Richard M. Worrel

United States Patent Office 3,140,556
Patented July 14, 1964

3,140,556
PERCUSSION TRAP FOR ANIMALS
Richard C. Wagner, 2351 W. Dakota, Fresno, Calif.
Filed July 3, 1961, Ser. No. 121,400
1 Claim. (Cl. 43—84)

The present invention relates to a percussion trap for animals and more particularly to such a trap mounting an explosive cartridge for actuation by animal contact or pressure applied thereagainst by animal activity.

Animals such as gophers, moles and the like are known to cause damage to lawns, shrubs, and even trees by their burrowing and root eating habits. Traps and poisons of various kinds have been employed in the tunnel runs of such animals with less than desired success. These devices include mechanically tripped forks, poison gas, detonating bombs and the like. The ineffectiveness of these previously known devices is due mainly to the animals wariness of foreign objects in their runs. Such burrowing animals frequently push dirt against the trap in order to isolate the trap from the burrow or to render it ineffective by triggering it. The projectile firing devices of the prior art are intended to overcome this problem but have not been entirely successful inasmuch as they must be loaded prior to their placement in the tunnel. This is due to the fact that such prior art devices require removal of the barrel from the trap for loading purposes. Therefore, considering the personal safety of persons placing the device, the triggering mechanism associated therewith must not be so sensitive as to be prematurely actuated during such placement. Frequently the triggering mechanism is safe, but is not sensitive enough to be set off in the manner desired. Furthermore, certain of the prior art devices employ triggering mechanisms which are disposed in a position to remain closely adjacent to the trajectory of the projectile. Such construction requires the most accurate aiming of the projectile barrel with each firing to preclude the possibility of striking the triggering mechanism rather than the animal.

It is therefore an object of the present invention to provide an improved percussion trap for animals such as moles, gophers and the like.

Another object is to provide such a trap adapted readily to be placed in the burrows and tunnel runs of such animals.

Another object is to provide a percussion trap with a triggering mechanism of greater sensitivity than that possessed by previous percussion traps.

Another object is to provide a percussion trap capable of being loaded subsequent to placement into animal burrows.

Another object is to provide such a trap wherein the triggering mechanism does not obstruct the firing area when the trap is actuated by the animal.

Another object is to provide an animal trap providing a lightweight structure which is easily transported, economically manufactured, and is safe and convenient to use.

Other objects and advantages of the present invention will become more fully apparent in the subsequent description in the specification.

Figure 1:
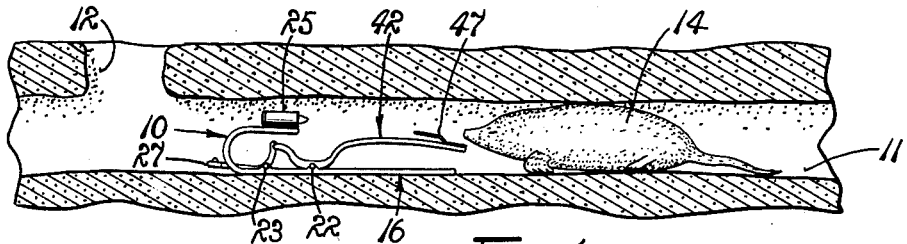
FIG. 1 is a side elevation of an animal trap embodying the principles of the present invention shown in a loaded and cocked condition and placed within an animal tunnel.

Referring more particularly to the drawing, the animal trap of the present invention is indicated generally at 10. As best shown in FIG. 1 the trap is preferably adapted to be inserted into a tunnel or burrow 11 of a mole or gopher by way of an opening 12 communicating with the atmosphere. An animal 14, representing a mole or gopher, is shown within the tunnel 11. It is to be noted, however, that the trap 10 is not restricted to such placement, but may have utility in other environments as will become more fully apparent in the following description.

Figure 2:
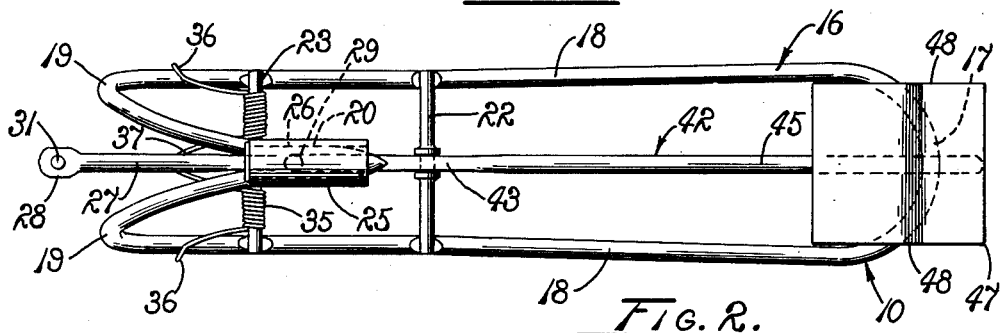
FIG. 2 is a somewhat enlarged plan view of the trap of FIG. 1 in the cocked position.
Figure 3:
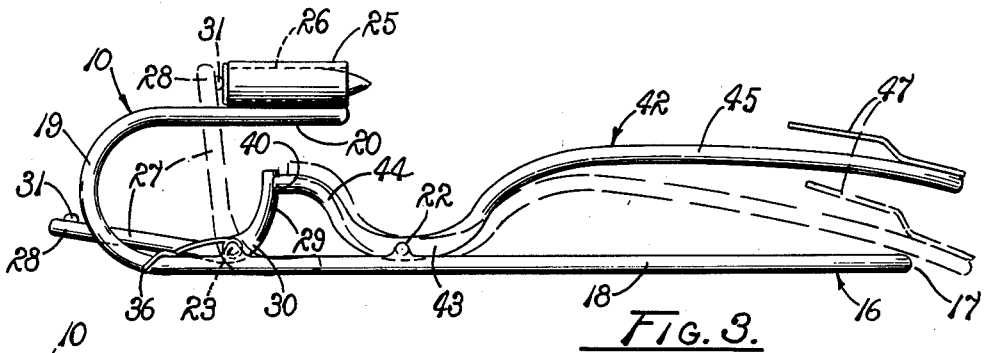
FIG. 3 is a side elevation of the trap of FIG. 2, showing in dashed lines the trigger mechanism actuated to a firing position.

The trap 10 provides a frame 16 preferably formed of a substantially rigid rod or wire of metallic or hard plastic material having a horizontally disposed planar loop portion 17 and a pair of elongated substantially parallel opposite side members 18. The frame further includes a rearward end 19 wherein the side rods 18 are upwardly arcuately extended to terminate in return bent ends 20 which inwardly converge in side by side relation to be rigidly joined by welding. A pair of longitudinally spaced transversely disposed forward and rearward pivot rods 22 and 23, respectively, rigidly interconnect the opposite side members 18 of the frame for a purpose soon to be described. An elongated hollow tubular member 25 is rigidly mounted as by welding or the like on the rearward ends 20 of the frame. The hollow tube 25 is thereby adapted to receive a conventional percussion cartridge 26 therein. As shown in FIGS. 2 and 3, the cartridge includes a casing having a peripherally extended rim portion and projectile portion adapted to be propelled from the casing by an explosive charge carried therein, as is well known in the art. The tube thus serves as a barrel having a breech end and an opposite muzzle end similar in operation to that employed in conventional firearms.

A hammer arm 27 provides a head end 28 and a trigger end 29 substantially right angularly extended therefrom by an arcuate intermediate portion 30. The head end 28 of the hammer includes a knob 31 outwardly projected therefrom which is adapted to serve as a firing pin to strike and to fire the cartridge 26 within the hollow tube. The arm is pivotally mounted at its intermediate portion 30 on the rearward pivot rod 23 for vertical swinging movement on the rod intermediate the opposite side members 18. A coil spring 35 having opposite ends 36 and an intermediate loop portion 37 is coiled about the rearward pivot rod 23. The opposite ends of the spring overlie the opposite side rods 18 of the frame and the loop portion of the spring engages the hammer arm eccentrically of the pivot rod normally to urge the end 28 thereof toward the cartridge striking position shown in dashed lines in FIG. 3. The trigger end of the rod also provides a notch 40 therein for reasons soon to become apparent.

A trigger rod 42 is provided with an arcuate mounting portion 43, a rearward notched sear end 44, and an elongated curved forward portion 45. The rod 42 is pivotally mounted at its arcuate portion 43 on the forward pivot rod 22 intermediate the side rods 18 in aligned relation to the hammer arm 27. The sear end 44 of the trigger rod is adapted for releasable engagement with the notch 40 in the hammer arm 27. The forward end 45 of the trigger rod mounts a substantially flat rectangular animal engaging plate 47 thereon. The plate has opposite side edges 48 aligned with the side rods 18 of the frame and also has an upper surface positioned slightly below an imaginary line tracing the trajectory of the projectile. A target area is thereby established directly above the engaging plate 47 at which the tubular member 25 is permanently aimed.

Operation

The operation of the described embodiment of the subject invention is believed clearly apparent and is briefly summarized at this point. When a mole run is present in a lawn, the turf directly thereabove is usually raised in relation to the surrounding area. Gopher runs are normally discovered by their periodic mounds. Accordingly, the precise location of such runs or tunnels are readily detected. In order to utilize the device of the present invention, a hole, such as that indicated at 12 in FIG. 1, is dug directly over and in communication with the tunnel 11.

Figure 4:
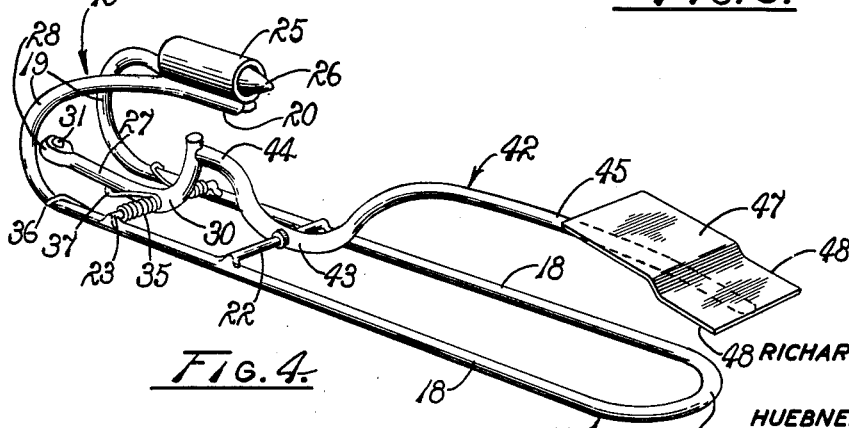
FIG. 4 is a perspective view of the animal trap shown in the cocked position of FIG. 1.

The trap 10 which is normally stored in the released or fired position as shown in dashed lines in FIG. 3, is manipulated to the cocked position, shown in FIGS. 1, 2 and 4. This is easily accomplished by manually swinging the hammer arm 27 in counterclockwise direction, as viwed in FIG. 1, against the spring 35 to a position in which the notch 40 of the trigger end of the hammer arm is aligned and engaged with the sear end 44 of the trigger rod 42. The trap is then placed into the run 11 by way of the hole 12 and a cartridge 26 is loaded within the hollow tube 25 with the rim of the casing thereof abutting the breech end of the tube. It is to be noted that the structure of the present invention readily permits the trap to be loaded after placement within the run. This construction precludes the possibility of accidental firing of the cartridge during such placement.

After loading, the trap may then be displaced a further distance along the run from the hole 12, so that it is less likely to be discovered by the animal. This displacement of the trap is also desirable if the hole 12 is to be filled immediately after placing the trap within the run.

Upon contact by the animal 14, or by the dirt barrier pushed ahead of the animal, the trigger plate 47 is moved downwardly and immediately disengages the sear end 44 of the trigger rod from the notch 40. The hammer arm 27 is thereby liberated to be swung upwardly in a clockwise direction about the pivot rod 23 by the spring 35. The cartridge 26 is fired by percussion of the knob 31 against the cartridge. Concurrently, the trigger rod plate 47 pivots downwardly by gravity to rest upon the loop portion 17 of the frame to clear the firing area immediately thereabove.

The projectile portion of the cartridge is propelled by the fulmination thereof in a direction forwardly longitudinally aligned with the frame 16 to strike the animal engaging the trigger rod plate 47. Also, the explosion of the cartridge causes the hammer arm to recoil in a counter-clockwise direction against the spring permitting the empty shell casing to be ejected rearwardly of the trap. The spring 35 then returns the hammer arm to the fired position of FIG. 3.

It is significant that the trap of the present invention is also effective under conditions where the animal attempts to push a pile of dirt ahead of the trap for isolating it from the run. With the sensitivity provided in the trap 10, the slightest pressure from the dirt pressed against the trigger plate causes the cartridge to be exploded in the previously described manner. Consequently, the projectile portion is propelled through the dirt to strike the animal.

From the foregoing it is readily apparent that the trap of the present invention provides a structure of the utmost simplicity which is highly effective for the intended purpose. It is more easily and safely loaded than any conventional trap of the practical art in that such loading may be accomplished subsequent to placing the trap in the animal's tunnel. Further, the barrel is rigidly mounted to obviate removal for loading and re-aiming. The triggering mechanism is located in a position remote from the firing path of the cartridge projectile; the trigger mechanism is also constructed and arranged to insure its being set-off by the slightest engagement by the animal, either directly or indirectly by dirt preceding the animal.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claim so as to embrace any and all equivalent devices and apparatus.

Having described my invention, what I claim as new and desire to secure by Letters Patent is:

A percussion trap for placement in animal runs comprising an elongated frame of substantially rigid rod-like material having opposite predetermined forward and rearward ends, said frame including a pair of transversely spaced substantially parallel side rods providing at said forward end a continuous planar loop portion, the frame terminating at said rearward end in upwardly arcuately return-bent portions inwardly converging in side-by-side relation, and a pair of forward and rearward longitudinally spaced substantially parallel pivot rods rigidly mounted between said side rods adjacent to the rearward end of the frame; a tubular projectile receiving member rigidly mounted on said return-bent portions of the frame substantially aligned longitudinally of the frame and having opposite open ends; a trigger rod pivotally mounted on said forward pivot rod intermediate the side rods and having an animal engaging portion disposed adjacent to said loop portion of the frame, and an opposite sear end; a hammer arm pivotally mounted on said rearward pivot rod in substantial alignment with said trigger rod and having a head portion constrained to an arcuate path of movement between a projectile engaging position adjacent to said tubular projectile member and a cocked position retracted toward said rearward end of the frame, said hammer arm including an opposite trigger end engageable by said sear end of the trigger rod to hold the hammer arm in said cocked position; and resilient means carried on said rearward pivot rod eccentrically engaging said hammer rod to urge the same toward said projectile engaging position incident to release of the sear end of the trigger rod from the hammer arm.

References Cited in the file of this patent
UNITED STATES PATENTS

| | | |
|---|---|---|
| 313,957 | Schaffer | Mar. 17, 1885 |
| 964,367 | Austin | July 12, 1910 |
| 967,026 | Lindsey | Aug. 9, 1910 |